US005697061A

United States Patent [19]
Krueger et al.

[11] Patent Number: 5,697,061
[45] Date of Patent: Dec. 9, 1997

[54] METHOD AND APPARATUS FOR PROVIDING INFORMATION CONCERNING PRODUCTS, USING RADIO FREQUENCY TRANSMISSIONS

[75] Inventors: Thomas E. Krueger, Kirkland; Kenneth L. Astrof, Edmonds, both of Wash.

[73] Assignee: Seattle Silicon Corporation, Bellevue, Wash.

[21] Appl. No.: 125,518

[22] Filed: Sep. 22, 1993

[51] Int. Cl.$^6$ .................................................. G06F 15/62
[52] U.S. Cl. ........................ 455/39; 340/825; 235/383
[58] Field of Search ........................ 345/2; 364/478, 364/479; 340/825, 825.06, 825.07, 825.1, 825.15, 825.18, 825.3, 825.35, 835.2; 235/383, 385; 455/39, 31.1, 32.1, 33.1, 33.4, 3.1, 66

[56] References Cited

U.S. PATENT DOCUMENTS

| | | |
|---|---|---|
| 3,715,725 | 2/1973 | Kievit et al. . |
| 4,002,886 | 1/1977 | Sundelin . |
| 4,139,149 | 2/1979 | Crepeau et al. . |
| 4,500,880 | 2/1985 | Gomersall et al. . |
| 4,521,677 | 6/1985 | Sarwin . |
| 4,603,495 | 8/1986 | Stevens . |
| 4,766,295 | 8/1988 | Davis et al. . |
| 4,821,291 | 4/1989 | Stevens et al. . |
| 4,879,756 | 11/1989 | Stevens et al. . |
| 4,937,586 | 6/1990 | Stevens et al. . |
| 4,939,861 | 7/1990 | Soubliere . |
| 4,962,466 | 10/1990 | Revesz et al. . |
| 5,019,811 | 5/1991 | Olsson et al. . |
| 5,111,196 | 5/1992 | Hunt . |
| 5,133,081 | 7/1992 | Mayo ................................. 455/66 |
| 5,172,314 | 12/1992 | Poland et al. . |

FOREIGN PATENT DOCUMENTS

| | | |
|---|---|---|
| 00304819 | 3/1990 | European Pat. Off. . |
| 0233587 | 8/1992 | Japan ................................ 345/2 |
| 0006773 | 9/1988 | WIPO ........................ 340/825.35 |
| 07318 | 3/1993 | WIPO . |

*Primary Examiner*—David E. Harvey
*Attorney, Agent, or Firm*—Robert M. Storwick

[57] ABSTRACT

A method and apparatus for providing information concerning products, using radio frequency transmissions. A host computer transfers information relating to a product to a radio frequency transmitter. The information is transmitted to a transceiver built into a label for the product, the label being located near a shelf of a gondola that is holding the product. The transmission from the transmitter to the transceiver may be made through one or more repeaters. A label transceiver for another product can act as a repeater, upon instruction from the host computer. When the intended label transceiver correctly receives the information concerning the product, it retransmits an acknowledgement back to the host computer along the same transmission path by which the information reached the transceiver. The transceiver stores the information relating to the product in the label. The transceiver and label are powered by a photovoltaic cell that transforms ambient light into electrical energy. If the ambient light decreases, in order to save electrical energy, the transceiver is first turned off. If it is necessary to save further electrical energy, the label display is next turned off. If the ambient light then increases, the display and then the transceiver are turned back on.

17 Claims, 5 Drawing Sheets

FIG. 1A

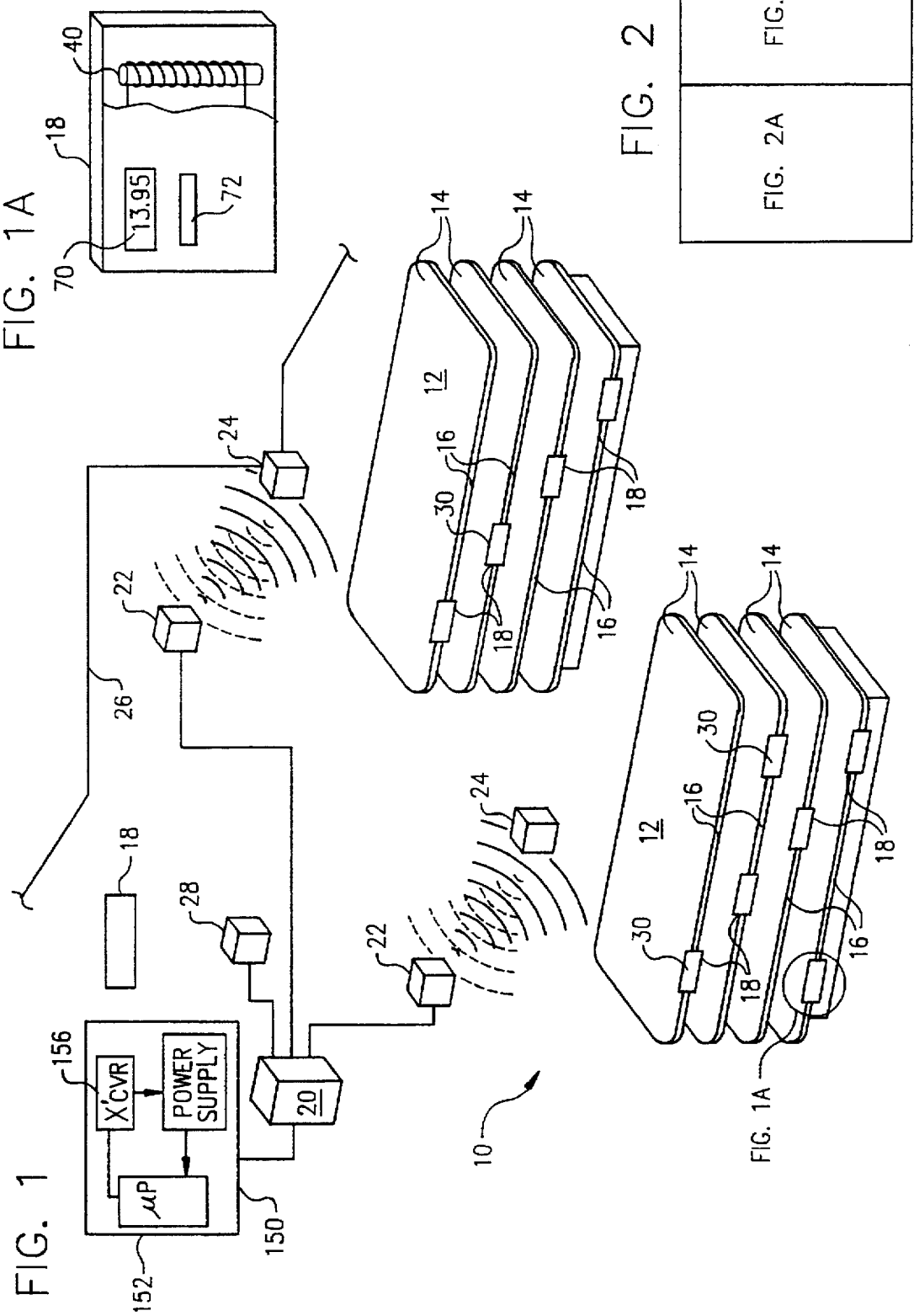

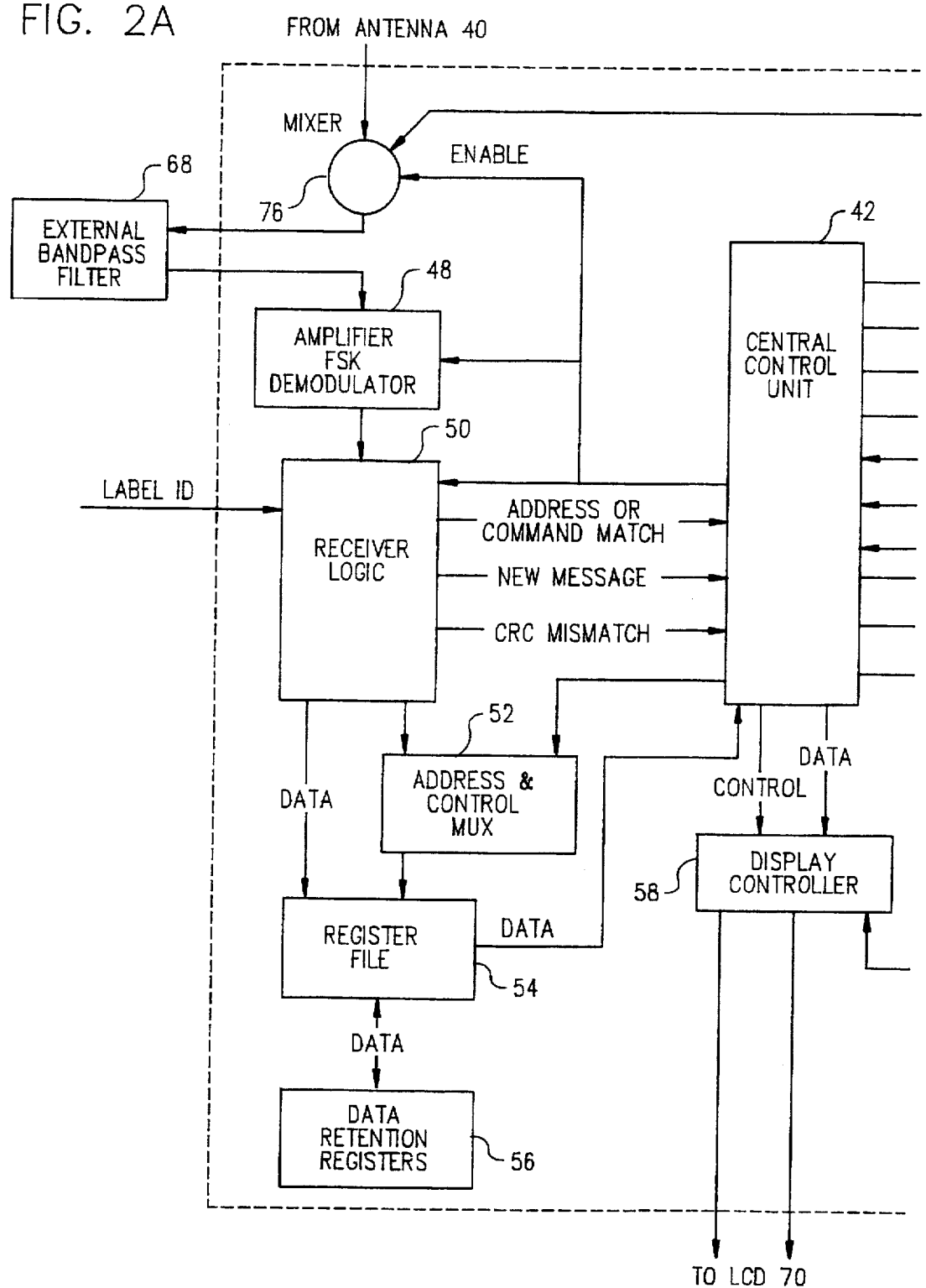

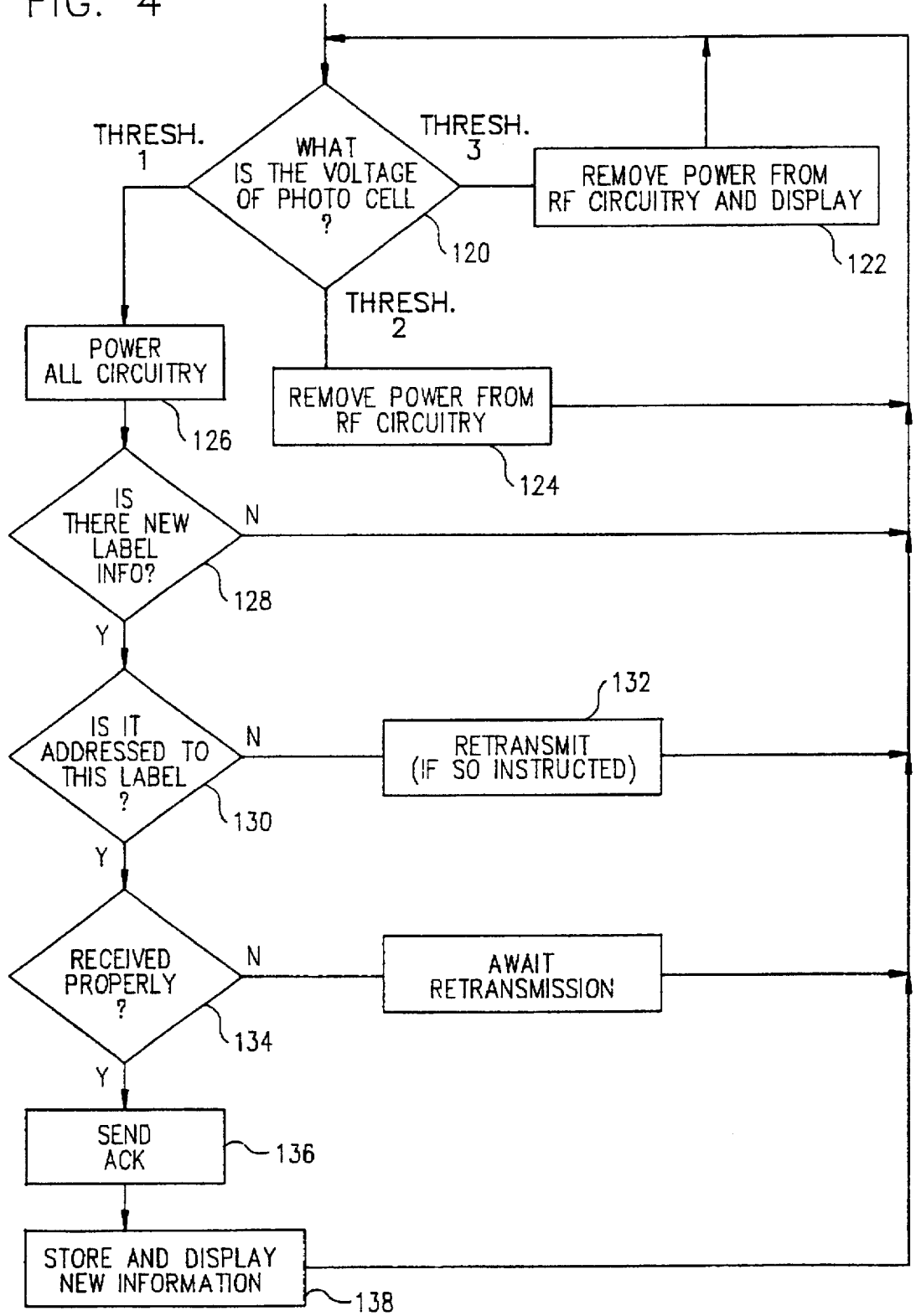

METHOD AND APPARATUS FOR PROVIDING INFORMATION CONCERNING PRODUCTS, USING RADIO FREQUENCY TRANSMISSIONS

FIELD OF THE INVENTION

This invention relates generally to methods and apparatus for providing product information, and more particularly, to a method and apparatus for providing information concerning products, using radio frequency transmissions.

BACKGROUND OF THE INVENTION

Typically, the sales of products in supermarkets and other commercial stores are dependent upon proper presentation of the products to consumers. Accordingly, it has become a standard for such products to be displayed on shelves so that they may be selected. In addition to the visual appeal of the products, of course, both proper product identification and price are important factors in product sales. Therefore, marketers have been encouraged to market products by precisely identifying each product and its price, so that members of the public can make informed decisions about the product and its price.

Another factor in the presentation of products is product location. Accordingly, marketers have learned to display products two ways. It is important for products to be consistently located within a store (and even within a chain of stores). But it is also important to be able to highlight products with special appeal, such as seasonal items or items that have a special low price. Accordingly, a given product can appear at more than one place within a store. One place is the product's consistent location. The other place is a special location of prominence, which is used when the product is on sale. In addition, marketers have learned to let their product location evolve slowly.

As a result, it can be important for a marketer to have a labelling system that can be easily changed, so that labels will reflect both the product's price as well as its location. For example, a shelf label should be changeable to reflect periodic price changes of a given product. The shelf label should also be changeable so that it can be used to label different products as the array of featured products changes.

Marketers have also learned of the great advantages of product identification systems, such as the Universal Product Code bar code, which facilitate tracking of inventory and render the changing of prices very easy, since it is only necessary to change the price in an office computer to cause the checkout stands to instantaneously begin charging the changed price. Therefore, it is advantageous to have a labelling system that can be used to track the flow of a particular product, in order to facilitate restocking and reordering of the product to allow an adequate inventory of the product to be maintained.

A number of labeling systems have been proposed in the past. In one, labels can be placed along the edges of the shelves where they make contact with electrical power lines and one or more data lines that carry product identification and pricing information to the proper label. One difficulty with such a system is that it requires special shelving units and, due to its exposure, is susceptible to damage—both accidental and intentional. Such a system may also present an electrical shock hazard to the shopping public.

In another system, it has been proposed to power shelving units with electrical power from leads located within the shelves, as discussed above, while allowing the product identification and pricing information to be transmitted to the labels by means of specially located light transmitters. One difficulty with such a system, however, is that it is not always possible to assure that all labels have been properly reprogrammed. The reason is that some label locations may be only marginally exposed to the light transmissions, leaving open the possibility of misprogramming or the failure to reprogram a given label. In addition, light systems are relatively wasteful of power and would not work well if the shelving units were not powered from leads located within the shelves.

Battery-powered labelling systems, of course, suffer from the need to change the batteries periodically to minimize the chance that a label will fail to work properly. Accordingly, it has become important to provide such labelling systems with ways to conserve their electrical power. In addition, frequent replacement of the batteries raises environmental concerns relating to battery disposal.

Accordingly, it would be advantageous to have a labelling system that could economically provide programmable labels which could be reliably programmed without consuming significant amounts of electrical power.

SUMMARY OF THE INVENTION

According to one aspect, the invention is an apparatus for communicating information between a host computer and a first product indicator. The apparatus comprises a converter to convert the information to a radio frequency signal and a transmitter to transmit the radio frequency signal. The apparatus further comprises a first electrical circuit to receive and to retransmit the radio frequency signal. In addition, the apparatus comprises a receiver to receive the retransmitted radio frequency signal and a signal transformer to transform the received retransmitted radio frequency signal and to produce information contained in the radio frequency signal.

According to a further aspect, the invention is an apparatus for communicating information between a host computer and a product indicator, the product indicator being located in an area containing ambient light energy. The apparatus comprises a first electrical circuit to convert the information to a radio frequency signal and to transmit the radio frequency signal. The apparatus also comprises a transducer to receive the ambient light energy and to produce therefrom electrical energy to deliver to the product indicator and a delivery circuit to deliver the electrical energy to the product indicator. Further the apparatus comprises a transceiver to receive and retransmit the radio frequency signal, the transceiver being located in the area containing the ambient light energy.

According to another aspect, the invention is a product indicator for storing information concerning a product. The product indicator comprises a receiver to receive a radio frequency signal containing information concerning a product and an address indicative of the product, a storage device to electronically store the information concerning a particular product with which the product indicator is associated, and a display to display the information concerning the particular product with which the product indicator is associated. The product indicator further comprises an energy source to provide electrical energy to the receiver, the storage device, and the display, an electronic circuit to determine the capability of the energy source to provide electrical energy to the means for receiving the radio frequency signal, to the display and to the storage device, and a controller to control the delivery of the electrical energy if the energy source is not capable of providing the electrical energy to all of the receiver, the display and the storage device.

According to a still further aspect, the invention is a method for communicating information between a host computer and a first product indicator. The method comprises the steps of a) converting the information to a radio frequency signal; b) transmitting the radio frequency signal; c) receiving and retransmitting the radio frequency signal; d) receiving the retransmitted radio frequency signal; and e) transforming the received retransmitted radio frequency signal to produce information contained in the radio frequency signal.

BRIEF DESCRIPTION OF THE DRAWINGS

FIG. 1 is a block diagram of an overall system for use in providing information concerning products, using radio frequency transmissions.

FIG. 1A is a schematic cross sectional perspective drawing of a label used in connection with the present invention.

FIG. 2 is a schematic diagram showing how FIGS. 2(a) and 2(b) are to be placed.

FIG. 2(a) is a first portion of a schematic diagram of a product information transceiver for use with the system shown in FIG. 1.

FIG. 2(b) is a second portion of a schematic diagram of a product information transceiver for use with the system shown in FIG. 1.

FIG. 4 is a flow chart describing the programming of the labels of the inventive system.

DETAILED DESCRIPTION OF THE PREFERRED EMBODIMENT

Figure 2B:
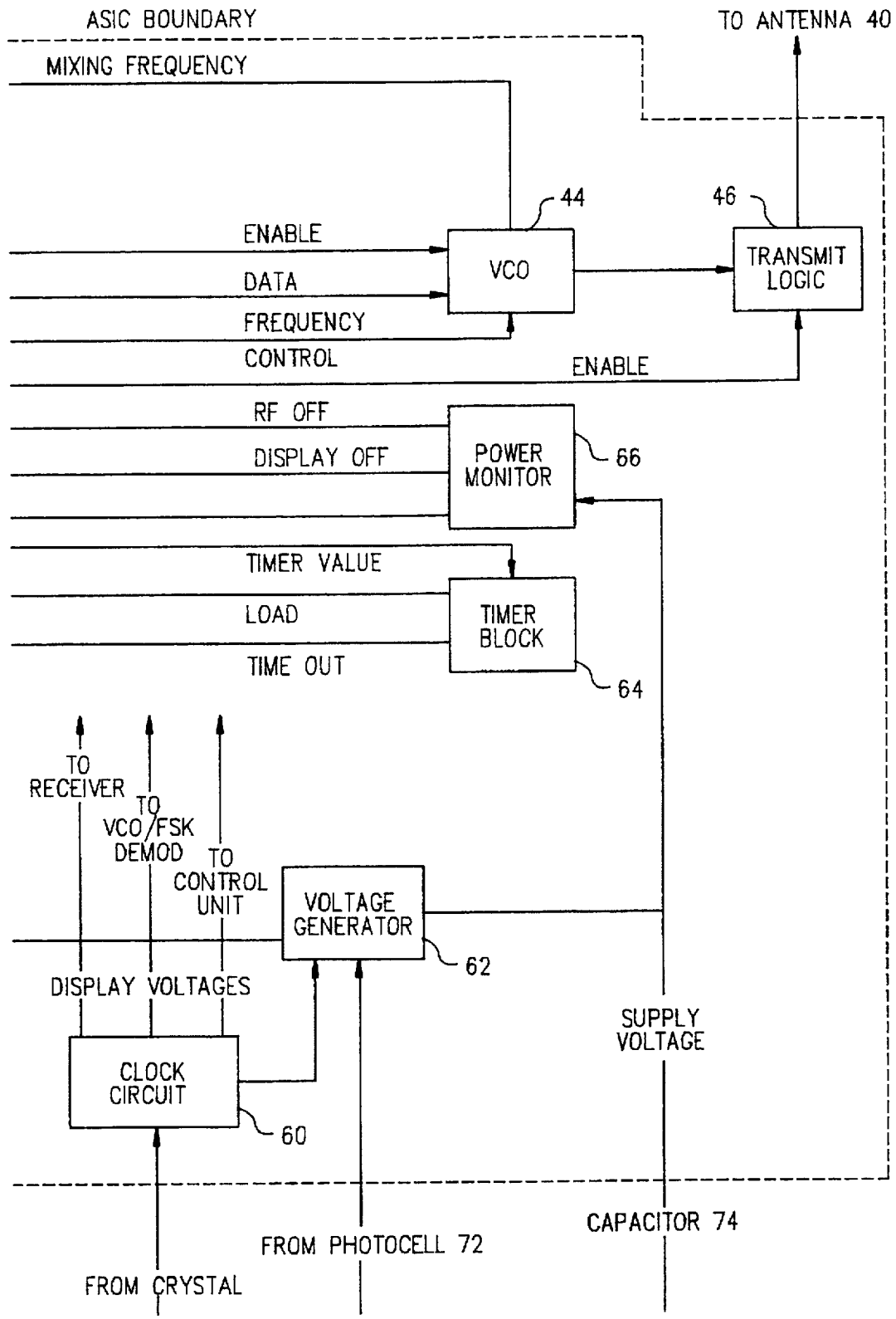

FIG. 1 is a block diagram of an overall labelling system for use in identifying products using radio frequency transmissions. FIG. 1A is a schematic cross sectional perspective drawing of a label used in connection with the present invention. The labeling system 10 includes a number of gondolas 12, each of which includes a number of shelves 14 whose edges 16 are shaped to receive removable programmable labels 18. Each label 18 includes a radio frequency receive/transmit antenna 40, a liquid crystal display (LCD) 70, a photovoltaic cell 72, and various other electronic components (to be described subsequently). The outward appearance of each label 18 is very similar to the labels sold by Electronic Retailing Systems International of Darien, Connecticut. The LCD 70 and the photovoltaic cell 72 appear on the exterior of the label 18, while the antenna 40 (a ferrite core antenna) and the various electronic components are placed inside the label 18. The programmable labels 18 are designed to be difficult for unauthorized persons to remove from the shelves 14.

Each label 18 has a unique address of 32 bits, which is assigned to the label 18 during the manufacturing process and maintained in a label ID register in the label 18. This assignment can be made by cutting links within a printed circuit board in the label, or by special coding in an ASIC that is incorporated in the label 18. Each label 18 can also contain other information, such as information that is to be displayed on the LCD 70, including the product price, the product's unit price, the number of facings (i.e., the lineal amount of shelf space allocated to the product, the recommended order quantity, the weekly movement of the product and the amount of the product in transit.

The labelling system 10 also includes a host computer 20 that contains inventory, price and product identification information. The host computer 20 is connected to a number of transmitters 22 which receive product price and identification information from the computer 20 and transmit radio frequency signals containing this information to a number of repeaters 24 that are strategically located on the ceiling 26 (or other appropriate surface) of the store. The radio frequency signals can be produced in accordance with standard digital communications techniques as described in "Digital Communications Fundamentals and Applications," by John Proakis (McGraw-Hill) and "Digital Communications," by Bernard Sklar (Prentice-Hall).

The radio frequency signals will operate activate a label 18 at distances of up to at least 150 feet. Their center frequencies can be chosen at 13, 27 or 49 MHz. A lower center frequency allows the ASIC in the label 18 to use less power, allows for lower risk in the ASIC design and allow for greater coverage due to RF bending and reflections. Potential interference at the frequency is also a consideration. The center frequency is established by a synthesizer in the label 18 which is described subsequently. The minimum acceptable number of center frequencies is two; optimally the number of center frequencies is five or more. The label 18 starts operation at a default center frequency but can be reprogrammed to another center frequency by the base system controlled by the host computer 20.

The labelling system 10 may also include an exciter 150 which can be used to retrieve an address from a label 18. The exciter 150 can also cause a label 18 to perform a self-test and to provide further information which is stored in the label 18. Finally, the exciter 150 can completely program a label 18. The exciter 150 is connected to the host computer 20, from which it receives its instructions and to which it transmits any information it retrieves from a label 18.

The exciter 150 includes a microprocessor 152, a power supply 154, and a transceiver 156. The microprocessor 152 and the transceiver 156 receive power from the power supply 154. The microprocessor 152 includes a memory in which data from the host computer 20 and data from the label 18 can be stored. The microprocessor 152, under direct command from the host computer 20, or operating from commands in the microprocessor memory that were downloaded from the host computer 20, causes the transceiver 156 to transmit a RF signal to the nearby label 18. The RF signal includes the commands.

The nearby label 18 responds to the RF signal in one of several different ways. For example, if the commands are prompting commands, the label 18 responds by transmitting a return RF signal, containing information, back to the exciter 150. This information includes data stored in the label 18 [for example, the label's address). The transceiver 156 in the exciter 150 receives the return RF signal, and the microprocessor 152 processes the return RF signal and determines the information contained therein. The exciter 150 can then store the information in the memory of the microprocessor 152, or transmit the information back to the host computer 20. The label 18 could also be commanded to perform a self-test, contained in a program stored in the memory of the microprocessor 152, which exercises the electronic components of the label 18, and to then issue a report to the exciter 150 via a return RF signal.

If desired, the exciter 150 can be handheld, which allows its use on installed labels 18. The exciter works by transmitting an RF signal to the label 18, causing the label 18 to emit its address, as if it were acknowledging the receipt of a RF signal containing information. This feature is useful when first programming the label 18, since the label 18 can be given a paper tag which describes a product with which the label 18 is to be associated. The tag includes both a printed description of the product and the universal product code (UPC) bar code for the product. If the bar code is first read by a bar code scanner associated with the host computer 20 and then the label 18 is caused to produce its address, the host computer 20 will associate that label's address with the product, until the label 18 is associated with another product by repeating the same process.

In addition to including the product information, the signals include address information which determines which of the labels 18 are to receive which information.

The radio frequency signals are received by the labels 18, where their address information is checked against the receiving label's address. If a label 18 has an appropriate address, it receives the remainder of the information in the radio frequency signals and transmits an acknowledge signal (ACK) which is returned to the host computer 20 along the same sequence of transmitters and repeaters as the radio frequency signals followed, but in the reverse order. This is called a "retransmit on error" system. The receiver 28 can be built into the transmitter 22.

In order to ensure that each label 18 receives the signals that are intended for it, the labels 18 also form a network of secondary repeaters. The labels 18 are equipped to process all signals that they receive and to retransmit all signals that they are not directed to retransmit. In this way, every label 18 can receive its intended signal through multiple paths, thereby greatly reducing the chance that it will not receive the necessary programming information. Each signal includes various fields which hold important information concerning its destination or origin, any instructions it may include, any data it carries, and a cyclic redundancy check (CRC) to verify correct receipt of the same signal that was transmitted. When a signal passes from a transmitter to a label 18 through a series of repeaters, each repeater notes the destination address and awaits the return of the ACK signal. Therefore, when the receiver to which the host computer 20 is attached receives an ACK signal, the signal's address tells the origin of the ACK signal.

The data are transferred to the labels 18 at a rate of 10 kilobits per second, with a minimum bit error rate of approximately $10^{-9}$, if error detection is used. The photovoltaic cell 72 will respond to any illumination in excess of about 20 lux. Security provisions are given to the labelling system 10 by encrypting the transmissions. One suggested standard is provided by IEEE 802.11, with a polynomial of $1+x^{-4}+x^{-7}$.

It is also desirable to make the labels 18 transportable. That is, each label 18 can be removed from one shelf 14 and relocated at any other desired shelf 14. Therefore, it is necessary for each label 18 to have its own transportable electrical energy transducer, the photovoltaic cell 72. The photovoltaic cell 72 is capable of converting the ambient light energy to electrical energy to supply the electrical energy needs for its attached label 18.

The labels 18 are subject to a number of conditions which demand special performance. For example, even if there is a great deal of light within the store where the labels 18 are in use, it is possible for a given label 18 to be shadowed by a consumer who is incidentally standing between the label 18 and its main source of light, thereby causing the label 18 to lose electrical energy. If the blockage condition lasts too long, the affected label 18 adopts a power-down mode in which it first shuts down the included transceiver 34. If the shadowing lasts too long, the affected label 18 next begins to shut down its display 36, and only retains its information stored in its internal memory.

Typically, this latter condition continues during the period when the store lights are turned off if the store is closed during night hours. Under these conditions, the label 18 assumes a low power consumption role which is reversed when the photovoltaic cell 72 on the label 18 again receives adequate amounts of ambient light energy. As the amount of light energy increases, the label 18 first begins to activate its display. As the amount of available light energy continues to increase, the label 18 next powers up its receiver (and transmitter, if so equipped) until it is again fully functional.

FIG. 2 is a schematic diagram showing how FIGS. 2(a) and 2(b) are to be placed. FIG. 2(a) is a first portion of a schematic diagram of a product information transceiver for use with the system shown in FIG. 1. FIG. 2(b) is a second portion of a schematic diagram of a product information transceiver for use with the system shown in FIG. 1. The transceiver 38, which can be incorporated in a single application-specific integrated circuit (ASIC) chip, is attached to an antenna 40 (not shown) which is used for both receiving and transmitting the radio frequency signals containing the information describing the product and the label address, as well as the radio frequency signals containing acknowledgement information. The transceiver 38 includes a central control unit 42, a voltage controlled oscillator (VCO) and frequency synthesizer 44, a transmit logic circuit 46, an amplifier/FSK demodulator 48, a receiver logic circuit 50, an address and control multiplexer 52, and data and data retention registers 54 and 56, respectively.

In addition, the transceiver 38 includes a display controller 58, a clock circuit 60, a voltage generator 62, a timer block 64, and a power monitor 66. The transceiver 38 is connected to an external bandpass filter 68, a label identification register (not shown), a liquid crystal display 70 (not shown), a conventional crystal 71, a photovoltaic cell 72 (not shown), as well as a 50 microfarad capacitor 74 (also not shown). The external bandpass filter 68 is 32 kHz wide and the crystal 71 operates at approximately 32 kHz.

Under control of the central control unit 42, the VCO 44 receives data and frequency signals from the central control unit 42 and modulates them on a radio frequency (RF) carrier signal which it transmits to the transmit logic circuit 46, as well as providing an unmodulated RF signal which is transmitted to a mixer 76. The mixer 76, which is enabled by the central control unit 42, also receives the signal from the antenna 40 to produce an intermediate frequency signal that contains the information originally transmitted. The information is encoded in frequency shift keyed form. The intermediate frequency signal is filtered by the external bandpass filter 68 and then fed to the amplifier PSK demodulator 48, which is enabled under control of the central control unit 42. The output of the amplifier FSK demodulator 48 is transmitted to the receiver logic circuit 50, which is also enabled by the central control unit 42, and receives label identification information concerning the particular transceiver 38. The label identification information is stored in a label identification register (not shown) which is external to the transceiver 38.

The receiver logic circuit 50 produces a number of outputs. Some of these signals are transmitted to the central control unit 42. They are an address or command match signal, a new message signal and a CRC mismatch signal. The address or command match signal is a signal indicating whether the address contained in the information encoded in the radio frequency signal matches the address of the transceiver 38. If the address matches, the central control unit 38 operates to produce other information from the demodulated radio frequency signal. If the signal contains a command match, the central control unit 42 will operate in accordance with the command. The new message signal informs the central control unit 42 that the demodulated radio frequency signal contains a new message. The CRC mismatch signal indicates whether a CRC check has indicated that the information contained in the demodulated radio frequency signal has been properly decoded. If so, the central control unit 42 causes the transmission of an acknowledge (ACK) signal and oversees operation of the transceiver, based on the information contained in the demodulated radio frequency signal.

The receiver logic circuit 50 also produces address and control signals which are transmitted to the address and control multiplexer 52. The address and control multiplexer 52 also receives control signals from the central control unit 42. The control signals are used to provide an address and other control signals to the register file 54. The register file 54 also receives data from the receiver logic circuit 50 and causes the storage of data, which it transmits back to the central control unit 42, and to the proper location in the data retention register 56.

The voltage controlled oscillator 44 also produces an output signal when required by the central control unit 42. The output signal from the voltage controlled oscillator 44 is transmitted to the transmit logic circuit 46, which is enabled by the central control unit 42.

Based on the information received by the central control unit 42, the central control unit 42 controls the operation of the LCD 70 which is built into the label of which the transceiver 38 is a part. The display controller 58 receives both control and data signals from the central control unit 42 and produces proper data and addressing signals to cause the desired product identification and pricing information to be shown on the LCD 70. The external crystal 71 produces a signal which is received by the clock circuit 60, which, in turn, produces clock signals required by the receiver logic 50, the VCO 44, the amplifier FSK demodulator 48, the voltage generator 62, and the control unit 42. The voltage generator 62 receives the voltage produced by the photovoltaic cell 72 and produces therefrom the supply voltage which it transmits to the display controller 58, the power monitor 66, and the capacitor 74. The capacitor 74 stores any excess charge produced by the photovoltaic cell 72, for use if the output of the photovoltaic cell 72 temporarily decreases. The power monitor circuit 66 produces three threshold signals which indicate the voltage level that is currently being produced by the photovoltaic cell 72. If the voltage produced by the photovoltaic cell 72 is currently sufficient to provide power to the radio frequency circuitry, the display and the information storage registers, all three of the threshold signals are on. If, however, the voltage produced by the photovoltaic cell 72 is currently not sufficient to simultaneously provide power to the radio frequency circuitry, the display and the information storage registers, the threshold signal controlling the radio frequency circuitry is turned off, disabling the radio frequency circuitry. If the voltage produced by the photovoltaic cell 72 further degrades, the threshold signal controlling the display is turned off, causing the LCD 70 to blank out. This technique preserves the information which the LCD 70 is intended to display during those periods when there is not enough ambient light to produce a sufficiently large voltage to power all of the circuitry of the label.

The timer block 64 receives a timer value from the central control unit 42 and produces a load signal and a time out signal in response.

Figure 3:
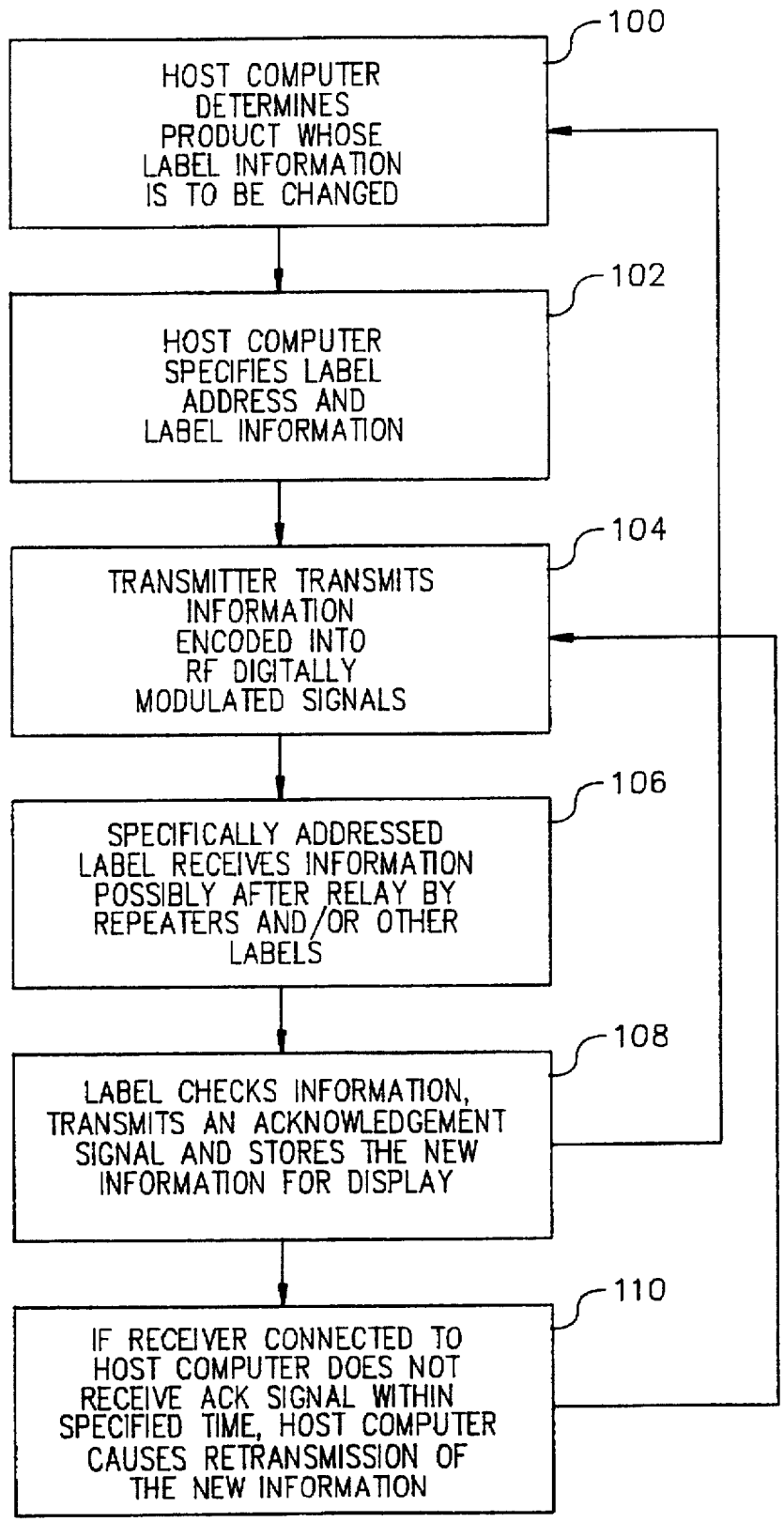
FIG. 3 is a flow chart describing the programming of the inventive system.

FIG. 3 is a flow chart describing the programming of the inventive system. In operation, the host computer 20 of the inventive system 10 determines a product whose label information is to be changed. The host computer 20 can make this determination with the help of human intervention through the use of conventional human/computer interface devices such as a keyboard and a display, or the host computer 20 can make the determination independently of human interaction (block 100). An example of the latter is when a series of price changes are to be made effective at a particular time—say, at midnight of a predetermined day. The host computer 20 then specifies the address(es) of the label(s) that are to have changes in information (block 102). The host computer 20 accomplishes this by reference to a database which it maintains to specify current and future product price and description data.

After the address and information have been specified, the host computer 20 transfers these data to the transmitter(s) 22 which broadcast narrowband RF signals containing the data directly to the addressed label 18, to repeaters 24, and/or to label repeaters 30 (block 104). The addressed label(s) 18 should receive the information within a specifiable period of time (blocks 106 and 108). When the addressed labels(s) 18 verify that they have correctly received the data, they transmit an acknowledgement (ACK) signal back to the host receiver 28, and store the new data for display (block 108). The host computer 20 then returns to block 100 for further determinations of products whose label information is to be changed.

If the host computer 20 does not receive an acknowledgement of its requested transmission from all of the addressed labels 18 (block 110), the host computer 20 causes the data to be retransmitted to the addressed labels from which it did not receive acknowledgements (block 104).

FIG. 4 is a flow chart describing the programming of the labels of the inventive system. The central control unit 42 of the specific label 18 continually checks the voltage output of its photovoltaic cell 72 and compares the voltage output to three thresholds (block 120). If the output voltage is less than the lowest threshold (threshold 3), the central control unit 42 removes electrical power from the radio frequency circuitry and display circuitry of the label 18, essentially only maintaining the information in storage registers (block 122). This represents the lowest power consumption condition of the label 18 (other than completely off, which condition would require retransmission of the information to the label 18). This is the condition that would occur daily after the store is closed and most of the lights are turned off, until they are turned on again. After ensuring that the electronic circuitry of the label 18 is in its lowest power-consumption mode, the label 18 returns to block 120.

If the voltage of the photovoltaic cell 72 is at a higher level (between threshold 1 and a higher threshold 2), the label 18 removes power from the radio frequency circuitry (block 124). This allows the label 18 to continue to display the information with which it has been programmed, but does not permit the label 18 to receive any new information from the host computer 20. After ensuring that the radio frequency circuitry is turned off, while the display circuitry is turned on, the label 18 returns to block 120.

If the voltage from the photovoltaic cell 72 is at a higher level (exceeding threshold 2), the label 18 provides electrical power to all of its circuitry, including the radio frequency circuitry (block 126). The label 18 then checks to determine whether there is any new label information being transmitted or repeated (block 128). If not, the label 18 returns to block 120. Otherwise, the label 18 determines whether the information is addressed to the particular label 18 (block 130). If it is not, the label 18 retransmits the information, if the label 18 is so instructed (block 132) and returns to block 120. Otherwise, the label 18 checks to determine whether the information that is directed to it has been received properly (block 134). If not, the label 18 enters a mode in which it waits for retransmission of the information and returns to block 120.

While the label 18 is waiting for transmission of the information, it can power down if its source of electrical power is at all marginal. In one embodiment, the label 18 can conserve electrical power by turning off its receiver, which it reactivates occasionally to determine whether a message directed toward the label 18 has been sent. Alternatively, in the wait mode, the label 18 can receive instructions causing it to shut down, can respond to an internal clock. Otherwise, the label 18 sends an acknowledgment signal (block 136), stores and displays the new information (block 138), and returns to block 120.

The preferred embodiment of the present invention has been described in detail sufficient for one skilled in the electronics and radio frequency arts to understand the invention. Such skilled persons, however, could devise alternative embodiments to that described herein while remaining within the scope of the appended claims. Accordingly, the scope of the invention is to be limited only by the appended claims.

We claim:

1. A product indicator for storing information concerning a product, comprising:
   a receiver to receive a radio frequency signal containing information concerning a product and an address indicative of the product;
   a storage device to electronically store the information concerning a particular product with which the product indicator is associated;
   a display to display the information concerning the particular product with which the product indicator is associated;
   an energy source to provide electrical energy to the receiver the storage device and the display;
   an electronic circuit to determine the capability of the energy source to provide electrical energy to the means for receiving the radio frequency signal, to the storage device and to the display; and
   a controller to control the delivery of the electrical energy if the energy source is not capable of providing the electrical energy to all of the receiver, the storage device and the display.

2. The apparatus of claim 1 wherein the controller reduces the energy delivered to one of the receiver, the display and the storage device.

3. The apparatus of claim 2 wherein the controller first reduces the energy delivered to the receiver before it reduces the energy delivered to either of the storage device or the display.

4. The apparatus of claim 2 wherein the controller reduces the energy delivered to the display after the controller has terminated delivery of electrical energy to the receiver.

5. The apparatus of claim 1 wherein the controller further comprises a transducer to provide additional electrical energy to the receiver, the storage device and the display.

6. The apparatus of claim 5 wherein the controller increases the energy delivered to the storage device before it increases the energy delivered to either of the receiver or the display.

7. A product indicator for storing information concerning a product, comprising:
   means for receiving a radio frequency signal containing information concerning a product and an address indicative of the product;
   means for electronically storing the information concerning a particular product with which the product indicator is associated;
   means for displaying the information concerning the particular product with which the product indicator is associated;
   means for providing electrical energy to the means for receiving the radio frequency signal, the means for electronically storing the information and the means for displaying the information concerning the particular product with which the product indicator is associated;
   means for determining the capability of the means for providing electrical energy to provide electrical energy to the means for receiving the radio frequency signal, to the means for electronically storing the information and to the means for displaying the information concerning the particular product with which the product indicator is associated; and
   means for controlling the delivery of the electrical energy if the means for providing electrical energy is not capable of providing the electrical energy to all of the means for receiving the radio frequency signal, the means for electronically storing the information and the means for displaying the information concerning the particular product with which the product indicator is associated.

8. The apparatus of claim 7 wherein the means for controlling the delivery of the electrical energy reduces the energy delivered to one of the means for receiving the radio frequency signal, the means for electronically storing the information and the means for displaying the information concerning the particular product with which the product indicator is associated.

9. The apparatus of claim 8 wherein the means for controlling the delivery of the electrical energy first reduces the energy delivered to the means for receiving the radio frequency signal before it reduces the energy delivered to either of the means for electronically storing the information or the means for displaying the information concerning the particular product with which the product indicator is associated.

10. The apparatus of claim 9 wherein the means for controlling the delivery of the electrical energy reduces the energy delivered to the means for displaying the information concerning the particular product with which the product indicator is associated after the means for controlling the delivery of the electrical energy has terminated delivery of electrical energy to the means for receiving the radio frequency signal.

11. The apparatus of claim 7 wherein the means for controlling the delivery of the electrical energy further comprising means for providing additional electrical energy to the means for receiving the radio frequency signal, the means for electronically storing the information and the means for displaying the information concerning the particular product with which the product indicator is associated if any of the means for receiving the radio frequency signal, the means for electronically storing the information and the means for displaying the information concerning the particular product with which the product indicator is associated is not receiving enough energy necessary for it to operate.

12. The apparatus of claim 11 wherein the means for controlling the delivery of the electrical energy first increases the energy delivered to the means for electronically storing the information before it increases the energy delivered to either of the means for receiving the radio frequency signal or the means for displaying the information concerning the particular product with which the product indicator is associated.

13. A method for storing information concerning a product, comprising the steps of:

a) receiving a radio frequency signal containing information concerning a product and an address indicative of the product;
   b) electronically storing the information concerning a particular product with which the product indicator is associated;
   c) displaying the information concerning the particular product with which the product indicator is associated;
   d) connecting a means for providing electrical energy to a means for receiving the radio frequency signal, a means for electronically storing the information and a means for displaying the information concerning the particular product with which the product indicator is associated;
   e) determining the capability of the means for providing electrical energy to provide electrical energy to the means for receiving the radio frequency signal, to the means for electronically storing the information and to the means for displaying the information concerning the particular product with which the product indicator is associated; and
   f) controlling the delivery of the electrical energy from the means for providing electrical energy if the means for providing electrical energy is not capable of providing the electrical energy to all of the means for receiving the radio frequency signal, the means for electronically storing the information and the means for displaying the information concerning the particular product with which the product indicator is associated.

14. The method of claim 13, further comprising the step of:

g) reducing the energy delivered to one of the means for receiving the radio frequency signal, the means for displaying the information concerning the particular product with which the product indicator is associated and the means for electronically storing the information.

15. The method of claim 14 wherein step g) includes reducing the energy delivered to the means for receiving the radio frequency signal before reducing the energy delivered to either of the means for electronically storing the information or the means for displaying the information concerning the particular product with which the product indicator is associated.

16. The method of claim 15 wherein the step of controlling the delivery of the electrical energy includes reducing the energy delivered to the means for displaying the information concerning the particular product with which the product indicator is associated after the means for controlling the delivery of the electrical energy has terminated delivery of electrical energy to the means for receiving the radio frequency signal.

17. The method of claim 16 further comprising the step of:

h) increasing the energy delivered to the means for electronically storing the information before increasing the energy delivered to either of the means for receiving the radio frequency signal or the means for displaying the information concerning the particular product with which the product indicator is associated.

* * * * *